(12) United States Patent
Farmer

(10) Patent No.: US 7,690,000 B2
(45) Date of Patent: Mar. 30, 2010

(54) METADATA JOURNAL FOR INFORMATION TECHNOLOGY SYSTEMS

(75) Inventor: Donald Munro Farmer, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 1816 days.

(21) Appl. No.: 10/753,639

(22) Filed: Jan. 8, 2004

(65) Prior Publication Data

US 2005/0165865 A1 Jul. 28, 2005

(51) Int. Cl.
*G06F 3/00* (2006.01)
*G06F 7/00* (2006.01)
(52) U.S. Cl. ...................................... 719/318; 707/100
(58) Field of Classification Search ................... 719/321, 719/318; 707/100
See application file for complete search history.

(56) References Cited

U.S. PATENT DOCUMENTS

| | | | | |
|---|---|---|---|---|
| 6,012,053 A * | 1/2000 | Pant et al. | ...................... | 707/3 |
| 6,061,692 A * | 5/2000 | Thomas et al. | .............. | 707/200 |
| 6,101,491 A * | 8/2000 | Woods | ........................... | 707/3 |
| 6,535,868 B1 | 3/2003 | Galeazzi et al. | ................ | 707/2 |
| 7,207,008 B1 * | 4/2007 | Koch | .......................... | 715/736 |
| 7,324,992 B2 * | 1/2008 | Hara et al. | ..................... | 707/6 |
| 7,430,587 B2 * | 9/2008 | Malone et al. | ............. | 709/217 |
| 2004/0139157 A1 * | 7/2004 | Neely et al. | ................. | 709/205 |
| 2005/0038814 A1 * | 2/2005 | Iyengar et al. | ........... | 707/104.1 |

OTHER PUBLICATIONS

Bontempo, C. et al., "The IBM Data Warehouse Architecture", *Communications of the ACM*, 41(9), Sep. 1998, 38-48.
Musick, R. et al., "Report on the Second IEEE Metadata Conference", *Metadata*, 1997, 5 pages.

* cited by examiner

*Primary Examiner*—Lechi Truong
(74) *Attorney, Agent, or Firm*—Woodcock Washburn LLP

(57) ABSTRACT

The metadata journal service records changes to an information system through client devices that send changes made to objects for recording in a server. A client calls the server when a metadata event is raised. A metadata event may be raised when an object is modified, created, or deleted. The client sends the object identifier of object involved in the metadata event to the server, along with schema objects and operations associated with the object. The server generates a unique key for the metadata event, and stores the objects along with their associated schema objects and operations in the metadata journal. The journal may be searched and queried to provide metadata analysis, such as lineage or impact analysis for an object in the system.

28 Claims, 7 Drawing Sheets

100

METADATA JOURNAL FOR INFORMATION TECHNOLOGY SYSTEMS

FIELD OF THE INVENTION

This invention relates in general to the field of metadata storage. More particularly, this invention relates to collection and storage of metadata in a computer system.

BACKGROUND OF THE INVENTION

Metadata can be defined as "data about data." It is essentially information which describes physical data structures, origins of data, and technical and business rules applied to data during various forms of transformation and movement, for example. A metadata journal provides a service for capturing and recording events which impact metadata and data in a warehouse.

Traditional approaches to metadata management have concentrated on metadata models stored in repositories. These repositories are abstract descriptions of a system which, when browsed or queried, can help the user in understanding the deployed system which it describes.

Metadata management systems built around metadata models and repositories have had a number of problems. In particular, the value of the system largely depends on the extent to which it really describes the deployed system. This can be affected by a number of factors including whether the model was created from the deployed system or vice versa, the detail the model captures about the deployed system, how changes in the deployed system are synchronized with the model, and how the relationship between the deployed system and the model is described and maintained.

In many systems, changes occur which are not captured in the repository, whether for technical or operational reasons. Every such change decreases the correspondence between the model and the deployed system and thus decreases the value of the metadata repository.

In view of the foregoing, there is a need for systems and methods that overcome the limitations of model based metadata solutions.

SUMMARY OF THE INVENTION

The following summary of the invention provides a basic understanding of some aspects of the present invention. This summary is not an extensive overview of the invention. It is not intended to identify critical elements of the invention or to delineate the scope of the invention. It is intended to present some concepts of the invention in a simplified form as a prelude to the more detailed description that is presented later.

The present invention is directed to a system and method for a metadata journal. Applications or clients are configured to raise a metadata event when certain user defined actions take place, such as modification, creation, or deletion of an object. An object can be a file, database, table, or any item in the system that may have metadata associated with it. After raising a metadata event, the client messages a metadata journal server to determine what metadata should be collected and regarding what objects it should collect metadata about. The metadata server determines if the client should record metadata, then returns to the client a list of the objects about which metadata should be recorded. The metadata client can then return the metadata corresponding to the metadata requested by the metadata server.

After receiving the requested metadata, the metadata server makes an entry in the metadata journal for the object(s) affected in the metadata event. This entry can include schema objects involved with the object, operations performed on the object and annotations associated with the object. This metadata journal can then be used to answer common metadata questions about the system, such as object lineage, execution auditing, impact analysis, and systems discovery, by traversing the journal entries for the object(s).

Additional features and advantages of the invention will be made apparent from the following detailed description of illustrative embodiments that proceeds with reference to the accompanying drawings.

BRIEF DESCRIPTION OF THE DRAWINGS

The foregoing summary, as well as the following detailed description of various embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF INVENTION

Exemplary Embodiments

Figure 1:
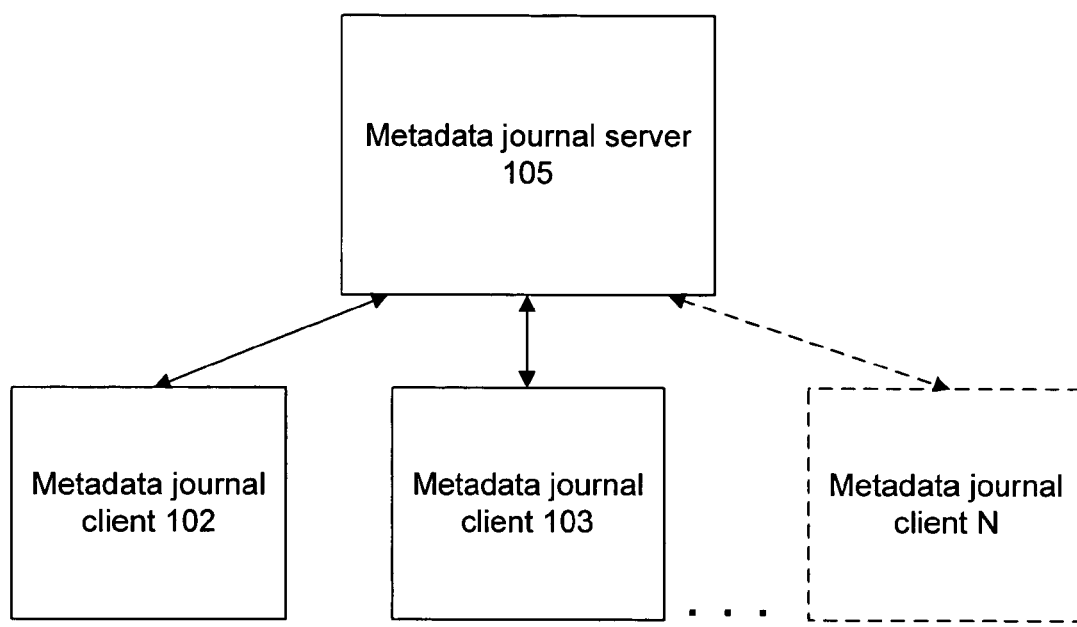
FIG. 1 is a block diagram of exemplary metadata journal clients and server in accordance with the present invention.

FIG. 1 is a block diagram of exemplary metadata journal clients and server 100 in accordance with the present invention. This exemplary embodiment includes metadata journal clients 102, 103 and a metadata journal server 105. Metadata journal clients 102, 103 can raise metadata events and transmit data related to those events for storage by the metadata journal server 105. Metadata journal clients 102, 103 are provided for illustrative purposes only, and not meant to limit the invention to only two metadata journal clients. There is no limitation to the number of metadata journal clients that can operate in accordance with the invention, as shown by metadata journal client N.

The metadata journal clients 102, 103 can be used to raise metadata events, and call the metadata journal server 105 based on certain predefined events happening. Metadata journal clients can be applications or design tools, or may be a separate service independent of the applications monitoring for situations that can trigger a metadata event. The metadata journal clients 102, 103 can communicate metadata events to a metadata journal server 105. The metadata journal server 105 can comprise a server along with a storage device such as a database. The metadata journal 105 can request and store metadata associated with a metadata event from metadata journal clients 102, 103.

In order for the metadata journal clients 102, 103 to know when to call the metadata journal 105, they should know that the metadata journaling service is enabled. The metadata data journaling can be coded into the clients. This can require that a special version of a particular application be written to provide for metadata journaling. For example, a design tool/application can be written to call the journaling service when a table is modified or a report is generated.

Each of the metadata journal clients 102, 103 can register with the metadata journal server 105. Registration allows the metadata journal server 105 to assign each of the metadata journal client 102, 103 a unique client identifier. This identifier can be determined by the metadata journal server 105. Each of the journal clients 102, 103 can also register the objects for which it can record metadata. The metadata journal server 105 can assign an object identifier for each object registered. The object identifier is desirably used by the metadata journal server 105 to refer to the objects in the metadata journal.

After registering with the metadata journal server 105, the metadata journal clients 102, 103 can call the metadata journal server 105 when a metadata event is raised. The metadata journal server 105 determines if it can accept metadata from the calling metadata journal client by examining the client identifier for that client. An administrator can have determined from which of the metadata journal clients 102, 103 it desires to record metadata. In addition, the administrator can have determined that it desires only to collect metadata regarding certain objects. The administrator can configure the metadata journal server 105 to collect only metadata from certain clients and regarding certain objects.

The metadata journal server 105 can respond to the calling journal client telling the client if it can record metadata, what objects the client can collect metadata from, and at what level of specificity. It may be appreciated that controlling the detail and specificity of the metadata collected by the clients from the server allows an administrator to easily control and adjust the level of the metadata collected.

The calling metadata client can receive a response from the metadata journal server 105 indicating if it can record metadata, what objects it can collect metadata from, and at what level of specificity. The calling metadata client can then return metadata for all objects involved in the metadata event that match the list returned by the metadata journal server 105, at the specificity requested by the metadata journal server 105.

The metadata journal server 105 can make an entry into the metadata journal for each object involved in the metadata event. This entry can be an entry in a table such as the metadata journal table 405 shown in FIG. 4. The metadata server can assign a unique key to the metadata event. This unique key can be stored with each entry in the metadata journal, allowing a user to later retrieve all of the entries in the metadata journal associated with a given metadata event by using the key. In addition, the metadata journal can have received additional information from the calling metadata journal client including schema objects involved in the metadata event and the particular operations involved in the event. These can also be added to the metadata journal along with the unique key.

The metadata journal server 105 can return to the calling metadata journal client a copy of the unique key. The metadata journal client can attach or store the unique key with any objects involved in the metadata event. It may be appreciated that by storing the key along with the objects, a user of an object may request the metadata associated with the object by requesting the metadata journal entries associated with the keys stored in the particular object.

Figure 2:
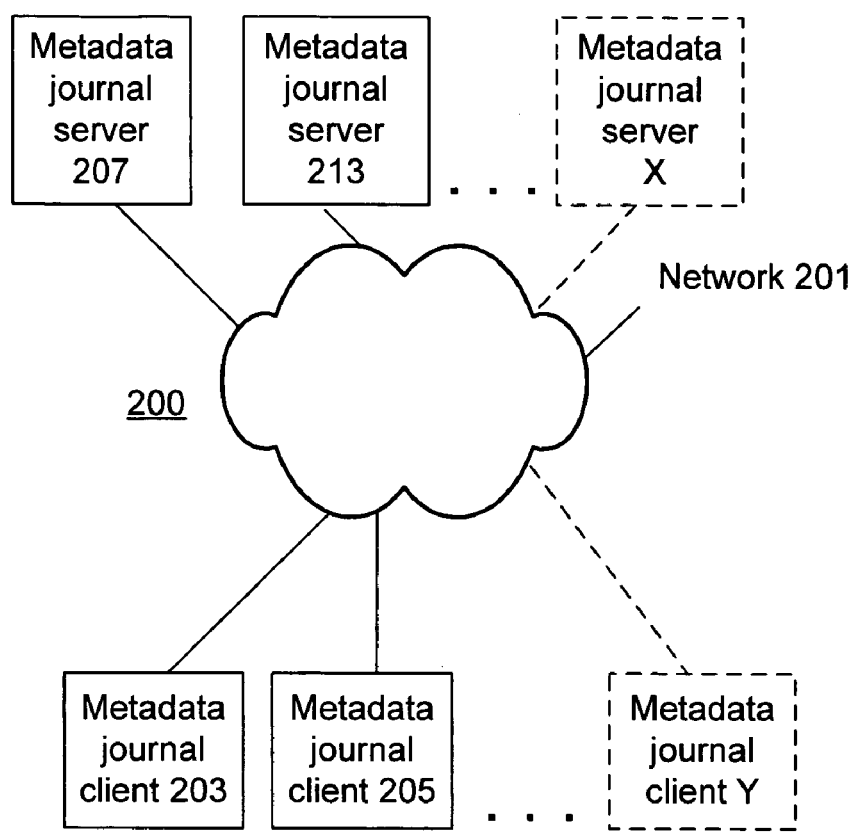
FIG. 2 is a block diagram of further exemplary metadata journal clients and servers in accordance with the present invention.

FIG. 2 is a block diagram of exemplary metadata journal clients and servers 200 in accordance with the present invention. This exemplary embodiment includes metadata journal servers 207, 213, metadata journal clients 203, 205, and a network 201.

Metadata journal clients 203, 205 can raise metadata events and transmit data related to those events across network 201 for storage by one or several of the metadata journal servers 207, 213. The metadata journal clients 203, 205 function similarly to the metadata journal clients 102, 103 as described in FIG. 1. The metadata journal clients 203, 205 are provided for illustrative purposes only, and not meant to limit the invention to only two metadata journal clients. There is no limitation to the number of metadata journal clients that can operate in accordance with the invention, as shown by metadata journal client Y.

Metadata journal severs 207, 213 can be distributed across network 201, or can exist as separate applications on a computer. Network 201 can be any type of network, such as a WAN type network, such as the internet, or a LAN type network, found in an office building for example. Together, the metadata journal servers 207, 213 provide similar functionality to the metadata journal server 105 described in FIG. 1. The Metadata journal servers 207, 213 are provided for illustrative purposes only, and not meant to limit the invention to only two metadata journal servers. There is no limitation to the number of metadata journal servers that can operate in accordance with the invention, as shown by metadata journal server X.

Figure 4:
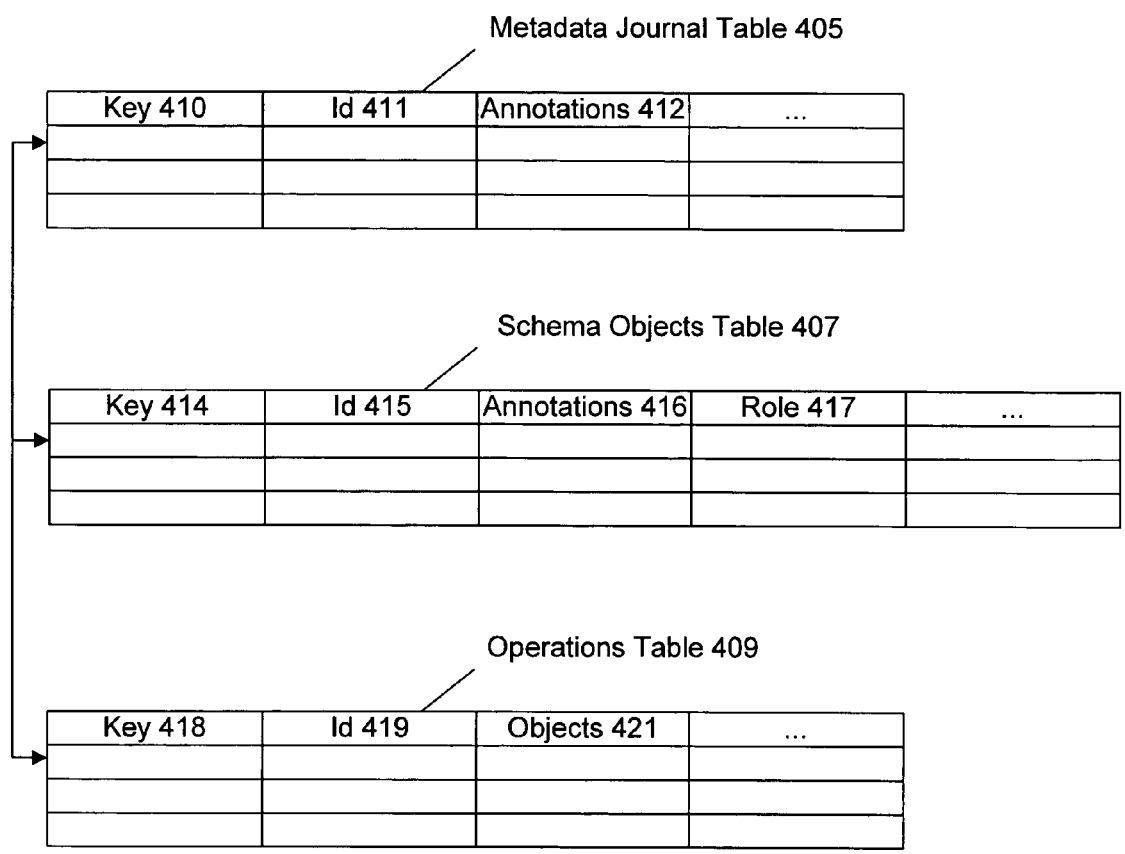
FIG. 4 is a block diagram of exemplary metadata journal storage in accordance with the present invention.

Each metadata journal server 207, 213 can provide a unique service of the metadata journal, or can operate identically and provide service to the closest metadata journal client 203, 205. For example, a metadata journal server can be configured to accept metadata for storage in the schema objects table 407, as shown in FIG. 4. Another metadata journal server can be configured to accept metadata for storage in the metadata journal table 405, as shown in FIG. 4. A metadata client can then be configured to communicate with the appropriate metadata journal server based on the type of metadata collected.

In another example a metadata journal server can be configured to maintain the listing of what metadata journal clients have journaling enabled, and what metadata should be collected by each of the metadata clients. A separate metadata journal server can be configured to accept and store the collected metadata.

Metadata journal servers configured to operate identically may each contain the same metadata journal. Metadata journal clients distributed across the network 201 can determine the closest metadata journal server to communicate with. Metadata journal servers can then periodically swap or trade received metadata to insure that the metadata journals remain identical.

Figure 3:
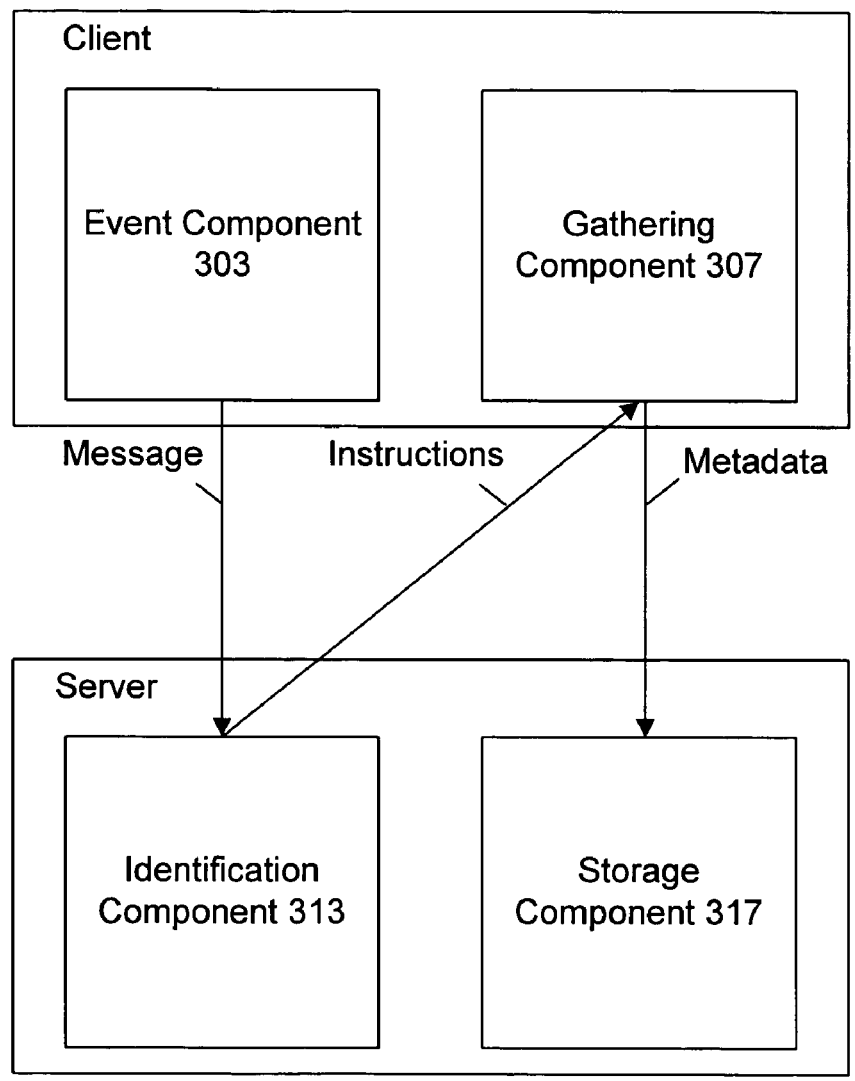
FIG. 3 is a block diagram of an exemplary metadata journal system in accordance with the present invention.

FIG. 3 is a block diagram of an exemplary metadata journal system 300 in accordance with the present invention. As shown, the exemplary metadata journal comprises four components, an event component 303, an identification component 313, a gathering component 307, and a storage component 317.

The event component can raise a metadata event by sending a message to a metadata server after some predetermined event takes place. The event component 303 can be part of a metadata journal client, such as metadata journal client 102 described in FIG. 1. The message sent by the event component 303 desirably includes a client identifier, that can be used by the identification component 313 to determine the metadata that can be recorded.

The identification component 313 can generate and send instructions for collecting metadata to a metadata client. The identification component 313 can be part of a metadata journal server, such as metadata journal server 105 described in FIG. 1. The instructions are desirably generated by retrieving the user or administrator determined instructions associated with the client identifier from a storage device. The instructions desirably include object identifiers of objects for the gathering component to collect metadata from, the level of detail of the metadata that should be recorded for each object, and the type of annotations that should be recorded for each object. The instructions can be used by the gathering component 307 to collect metadata.

The gathering component 307 can collect metadata responsive to instructions related to a metadata event, and send the collected metadata to a server for storage. The gathering component 307 can be part of a metadata journal client, such as metadata journal client 102 described in FIG. 1. The collected metadata can then be sent to the storage component 317 for storage.

The storage component 317 can generate a key for a metadata event, send the generated key to a client, and store the key with the collected metadata. The storage component 317 can be part of a metadata journal server, such as metadata journal server 105 described in FIG. 1, and can include a storage device such as a database. The generated key can be unique to the metadata journal, and is desirably used by the metadata journal to group objects, operations and schema objects associated with the same metadata event.

FIG. 4 is a block diagram of exemplary metadata journal storage 400 in accordance with the present invention. As shown, the metadata journal contains three tables: the metadata journal table 405, a schema objects table 407, and an operations table 409. Additional or alternate tables and/or data structures are contemplated.

The metadata journal table 405 can contain a row entry for each object involved in a metadata event. A metadata event can be any event where metadata is generated, such as modification or deletion of a file. An object can include any of a variety of suitable items that may have metadata associated with it. Examples of objects include, but are not limited to, files, reports, and OLAP cubes. Each row entry can also contain several columns. In the exemplary embodiment these can include, but are not limited to, a key column 410, an id column 411, and an annotations column 412. It is appreciated that additional columns can be added or removed providing the ability to tailor the type of information collected about the objects.

The key column 410 can contain a key value associated with each metadata event. Each key can be a unique number or name that may be used to identify the corresponding row entries in the tables of the metadata journal associated with this particular metadata event. This key value can be generated by the metadata server 105 shown in FIG. 1. For example, assume an entry for a report in the metadata journal table contains a key of 17 in the key column. The entry in schema objects table 407 for the database that generated that same report will desirably also contain a key of 17 in the key column. It is appreciated that the key column links table entries associated with a metadata event with the other table entries associated with the same metadata event in the metadata journal.

The id column 411 can contain a unique identifier (referred to herein as "object id") associated with each object. The object id can be assigned by the metadata journal server 105 when a metadata journal client registers the object. The object id can be generated by the metadata journal server 105 or may use a name or number associated with the object in an already existing metadata catalog or repository. For example, for any given object there can already exist metadata stored in a existing metadata repository with a particular number or name. Given that name or number, the existing metadata can be retrieved from the old repository. It is appreciated that storing the unique identifier in the metadata journal table 405 enables interoperation of the metadata journal with a wide variety of other metadata solutions, and allows the metadata associated with a particular object id to be easily retrieved from the metadata journal.

The annotations column 412 can be used to store contain certain non-canonical information associated with each object. For example, the subject area of a database or a friendly name for the parent system could be stored in the annotations field for an object associated with a metadata event. The annotations column 412 can be a special field in the metadata journal table 405 and can contain an XML structure defined by the metadata journal server 105. The annotation column 412 can be populated in using any method, such as "snapshot" and "cumulative", for example. This population option can be determined by the metadata journal server 105. "Snapshot" annotations are the highest level of annotations from the object associated with the metadata event. "Cumulative" annotations are some or all of the annotations associated with the individual objects that can make up the object associated with the metadata event. For example, an OLAP cube can contain several sources of data, each with its own associated annotations. In "Snapshot" mode, an annotation such as the name of the cube is recorded. In "Cumulative" mode, an annotation is recorded containing some or all of the annotations of each object making up the OLAP cube.

The schema objects table 407 can contain a row entry for each schema object involved in a metadata event. A metadata event can be any suitable event where metadata may be generated, such as modification or deletion of a file. A schema object is an object that a particular object involved in the metadata event may have been created from or depends on. For example, in a metadata event such as a report being generated, the schema object may be the column of data that was the source of the report. Each row entry in the schema objects table 407 can also contain several columns. In the exemplary embodiment, these can include, but are not limited to, a key column 414, an id column 415, an annotations column 416, and a role column 417. It is appreciated that additional fields may be added or removed providing great flexibility for the user.

The key column 414 can be similar in purpose to the key column 410 described above. Each key can be a unique number or name that can be used to identify the corresponding row entries in the tables of the metadata journal associated with this particular metadata event. It is appreciated that the key column 414 provides the ability to find the schema objects associated with a metadata event by key value.

The id column 415 can be similar in purpose to the id column 411 described above. The field can contain a unique identifier (referred to herein as "schema object id"). The schema object id can be assigned by the metadata journal server 105 when a metadata journal client registers the schema object, or can contain a name or number associated with the schema object in an already existing metadata catalog or repository.

The annotations column 416 can be similar in purpose to the annotations column 412 described above. The annotations column 416 can contain certain non-canonical information associated with each schema object. For example, the subject area of a database or a friendly name for the parent system could be stored in the annotations field for the schema object involved in the metadata event.

The role column 417 can contain the role or purpose that a particular schema object played in the metadata event. For example, in a metadata event such as creation of a file from a database, the database would be the schema object. The entry in the row of role column 417 associated with the database schema object could be the word source, or some code representing the role of the database. This entry can be supplied by the application raising the metadata event.

The operations table 409 can contain a row entry for each operation associated with a metadata event. A metadata event can be any event where metadata is generated, such as modification or deletion of a file. For example, in a metadata event such as a report being generated from a table query, there can be two entries in the operations table 409, one indicating that a report was created, and another indicating that a query was ran. Each row entry in the operations table 409 can also contain several columns. In an exemplary embodiment, these can include, but are not limited to, a key column 418, an id column 419, and an objects column 421. It is appreciated that additional fields can be added or removed providing great flexibility for the user.

The key column 418 can be similar in purpose to the key column 410 described above. Each key can be a unique number or name that can be used to identify the corresponding row entries in the tables of the metadata journal associated with this particular metadata event. It is appreciated that the key column 418 provides the ability to find some or all operations associated with any metadata event by key value.

The id column 419 can be similar in purpose to the id column 411 described above. The field can contain a unique identifier (referred to as "operation id"). The operation id can be assigned by the metadata journal server 105 when a metadata journal client registers the operation, or can contain a name or number associated with the operation in an already existing metadata catalog or repository.

The objects column 421 can contain some or all of the objects involved in the operation. The objects can be identified by their object id. For example, in a metadata event involving a word processing file being generated from several smaller word processing files there would be an entry in the operations table for the operation of creating a file. In the objects column 421 there would be an entry for the object id of each file used to generate the resulting word processing file.

Given a metadata journal as described in the example embodiments, there are several ways that the journal can be used to provide accurate metadata about an object in the system. A user can desire to retrieve lineage associated with a particular object such as a report. This lineage data describes where the report came from and from what other objects it may depend. The user can query the metadata journal using the object id of the report looking for any entries where this particular report was created or generated. This would lead to the entry in the metadata journal for the metadata event where the report was created from a schema object, for example, a table in a database. The table can have its own object id that can be used to query the metadata journal for information regarding its lineage. The "tree" of lineage can be traced back until the level of metadata that the user desires has been uncovered. By following the trail of metadata journal entries the user is able to reconstruct, at the level of detail specified by the administrator, the lineage data for any object in the metadata journal.

A user can also wish to perform an impact analysis regarding a particular object in a system. An impact analysis for a particular object can provide information regarding what other objects depend on that particular object. For example, a user can wish to delete a table in a database. The user first performs an impact analysis to determine what objects if any may be affected by the deletion. This impact analysis is performed by querying the metadata journal using the object id of the table. This query can return metadata events where the table appears as a source for the creation of another object. Those objects may themselves appear in the metadata journal as the source for the creation of several other objects. The full impact analysis can be generated for the table by following the metadata trail through the metadata journal for each object that depends on the table.

Figure 5:
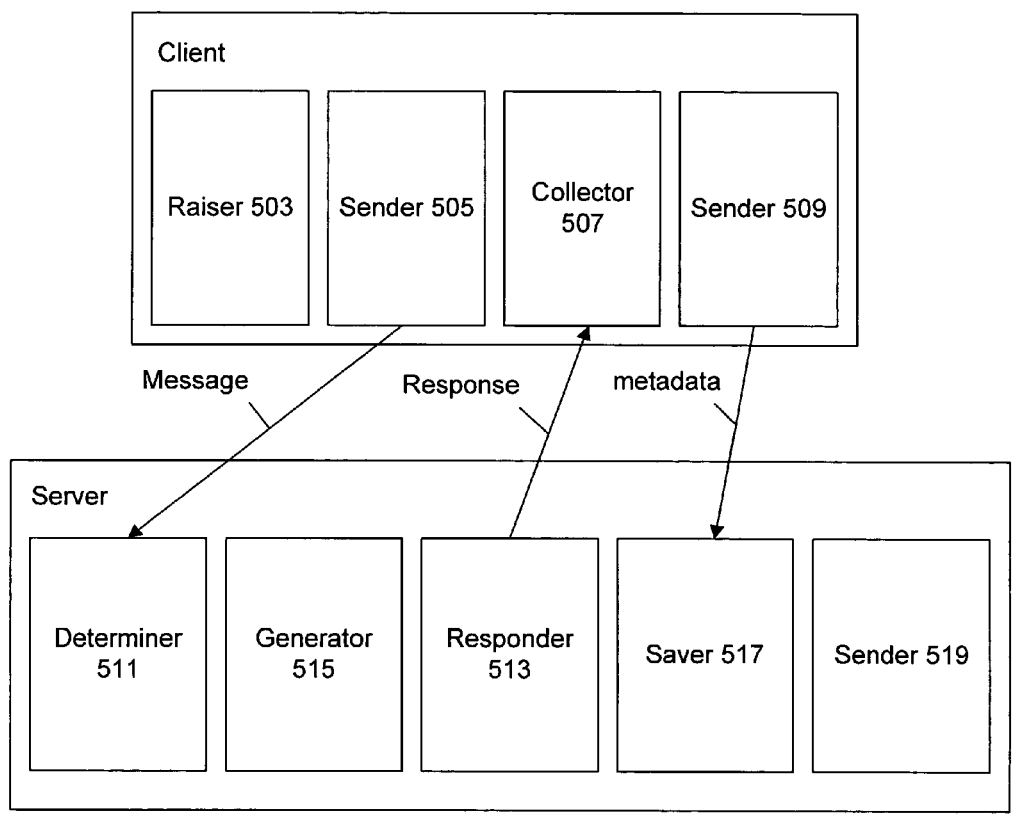
FIG. 5 is a block diagram of another exemplary metadata journal system in accordance with the present invention.

FIG. 5 is block diagram of a metadata journaling system 500 in accordance with the present invention. The metadata journaling system includes several means for performing functions. These means include a raiser 503, a sender 505, a collector 507, a sender 509, a determiner 511, a responder 513, a generator 515, a saver 517, and a sender 519.

The raiser 503 raises a metadata event after a predetermined happening. An administrator or user desirably determines what events will cause a metadata event to be raised. The raiser 503 can be implemented using any suitable system, method or technique known in the art for raising an event. The raiser 503 can be implemented using software, hardware, or a combination of both. The raiser 503 can be a part of the metadata journal client 103, as shown in FIG. 1.

The sender 505 sends a message indicating that a metadata event was raised. The message desirably includes a client identifier. The sender 505 can be implemented using any suitable system, method or technique known in the art for computer messaging. The sender 505 can be implemented using software, hardware, or a combination of both. The sender 505 can be a part of the metadata journal client 103, as shown in FIG. 1.

The collector 507 collects metadata responsive to instructions. The instructions desirably include the object identifiers of any objects from which to record metadata, the level of detail of the metadata, and the type of annotations to collect. The collector 507 can be implemented using any suitable system, method or technique known in the art for collecting data responsive to instructions. The collector 507 can be implemented using software, hardware, or a combination of both. The collector 507 can be a part of the metadata journal client 103, as shown in FIG. 1.

The sender 509 sends the collected metadata to a server. The collected metadata desirably includes an object identifier for any objects involved in the metadata event, the schema objects identifier for any schema objects involved in the metadata event, and the operations identifier of any operations performed on the objects involved in the metadata event, for example. The sender 509 can be implemented using any suitable system, method or technique known in the art for computer messaging. The sender 509 can be implemented using software, hardware, or a combination of both. The sender 509 can be a part of the metadata journal client 103, as shown in FIG. 1.

The determiner 511 determines what metadata a calling client can record. An administrator or user desirably predetermines what metadata each client can record in a list or database. The metadata that can be recorded for each client can then be retrieved using the client identifier. The determiner 511 can be any implemented using any suitable system, method or technique known in the art for retrieving, setting, and storing permissions on a computer, for example a database. The determiner 511 can be implemented using software, hardware, or a combination of both. The determiner 511 can be a part of the metadata journal server 105, as shown in FIG. 1.

The responder 513 responds to the client with what metadata the client can record. The response desirably includes the object identifiers of any objects to record metadata from, the level of detail of the metadata, and the type of annotations to collect, for example. The responder 513 can be implemented using any suitable system, method or technique known in the art for computer messaging. The responder 513 can be implemented using software, hardware, or a combination of both. The responder 513 can be a part of the metadata journal server 105, as shown in FIG. 1.

The generator 515 generates a unique key for the metadata event. The unique key is desirably used to associate each metadata journal entry with the metadata event that caused the entry. The generator 515 can be implemented using any suitable system, method or technique known in the art for creating a unique identifier, for example a random number generator. The generator 515 can be implemented using software, hardware, or a combination of both. The generator 515 can be a part of the metadata journal server 105, as shown in FIG. 1.

The saver 517 stores the collected metadata along with the generated key. The metadata is desirably stored in a database or table with an entry for each object, schema object, and operation, in addition to the generated key, for example. The saver 517 can be implemented using any suitable system, method or technique known in the art for data storage. The saver 517 can be implemented using software, hardware, or a combination of both. The saver 517 can be a part of the metadata journal server 105, as shown in FIG. 1.

The sender 519 returns the generated key to the calling client. The generated key can be attached by the client to objects involved in the metadata event, providing a user of the object with the ability to quickly retrieve metadata associated with the object using the generated key. The sender 519 can be implemented using any suitable system, method or technique known in the art for computer messaging. The sender 519 can be implemented using software, hardware, or a combination of both. The sender 519 can be a part of the metadata journal server 105, as shown in FIG. 1.

Figure 6:
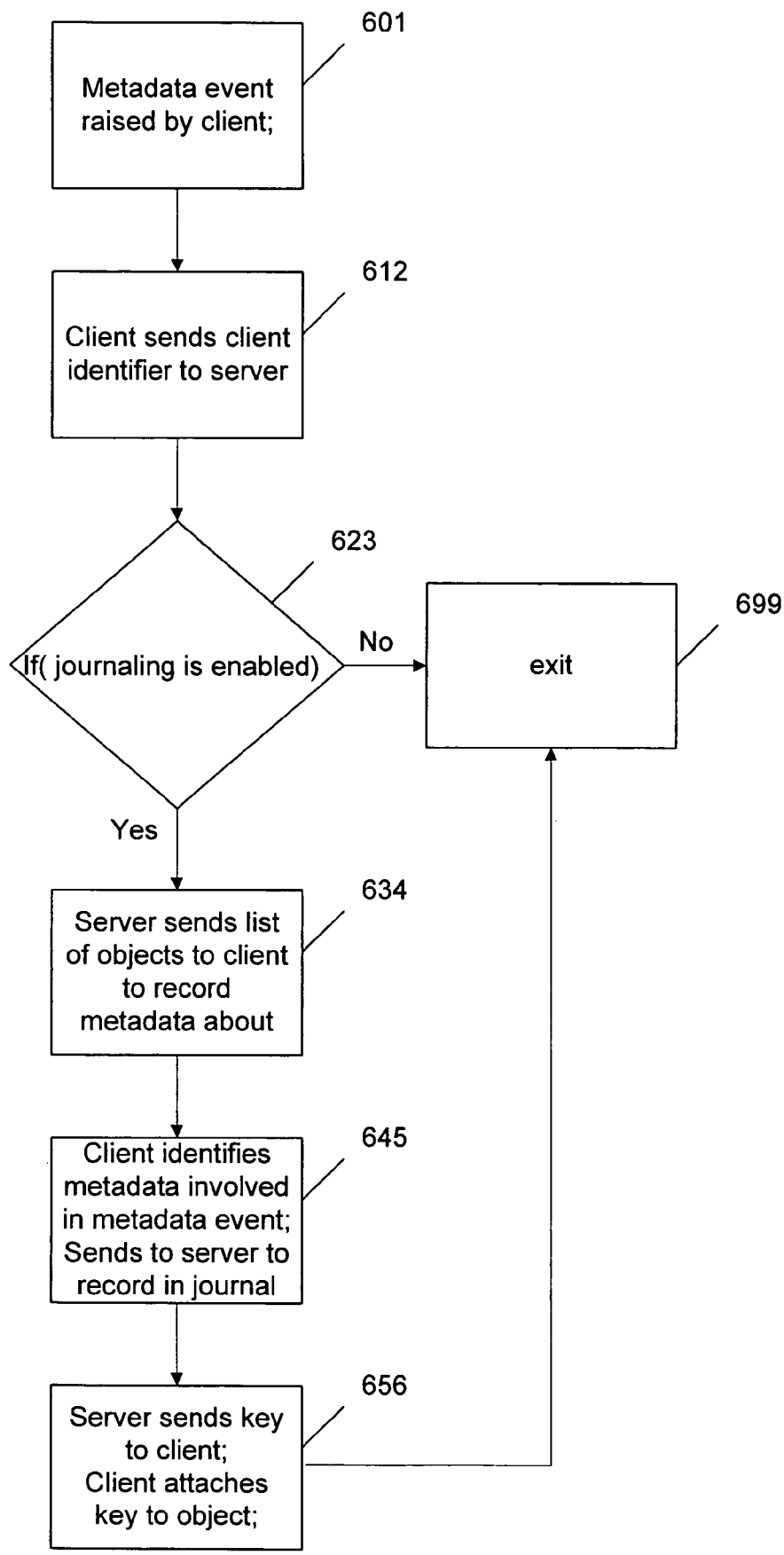
FIG. 6 is a flow diagram of an exemplary method for entering metadata in a metadata journal in accordance with the present invention.

FIG. 6 is a flow diagram of an exemplary method of updating the metadata journal in accordance with the present invention. In this exemplary embodiment, as described in further detail below, a metadata event is raised by an application or server, the journal service is called by the application or server, the journal service returns a list of objects for which events should be journaled, the application or server calls the journal service to write an entry for each of the matching objects that needs to be journaled, and an entry is made in the metadata journal.

At 601, a metadata event is raised by a client or application. The client or application may be configured to raise a metadata event based on the happening of an event involving an object, such as a text file or a report. For example, a user modifying data or the creating of new document may raise a metadata event.

At 612, the client or application calls the metadata journal server. The client or application can call the journal server by sending a message or communication containing information that the journaling service uses to identify the client or application. For example, the client can send a client identifier. It is appreciated that any suitable method, technique, or system for computer messaging can be used.

At 623, the journal server receives the client identifier and verifies if the client or application has journaling enabled. The journal service can also determine what objects associated with the event the client or application should be recorded. The journaling service can contain a table or listing of all the servers or applications and what objects, if any, should be journaled by them. For example, an entry for a database application can contain instructions to record entries affecting all tables, or can contain instructions to record entries only effecting specific tables. This allows the administrator or user of the metadata journal to control the specificity and type of metadata recorded.

If the journal server determines that the client has journaling enabled, the process continues at 634, otherwise, the process exits at 699.

At 634, the journal server can respond to the client or application by sending a message or communication containing a listing of the objects for which metadata should be recorded. It is appreciated that any method, technique, or system known in the art for computer messaging can be used.

At 645, the application or server has received the message or communication containing the listing of objects for which metadata should be recorded. The client or application can now determine what objects matching the received listing of objects were involved in the metadata event. The client or application then sends a message or communication to the journal server to write an entry in the metadata journal table for each affected object. The message can contain an object identifier used to uniquely identify the object in the journal, any annotations associated with the object, either "cumulative" or "snapshot", for example, depending on the journal settings, any names for the object used in previous or legacy metadata solutions, and any other information that may be entered in the metadata journal table of the server. The server can write an entry in the metadata journal table for each object affected and add the received information to the appropriate columns. The server can also assign the metadata event a unique key that is entered in the metadata journal table along with each object entry. The unique key is used to associate each metadata journal entry by metadata event.

The application or client can also send the schema object identifiers of any schema objects involved in the metadata event. The server can enter each schema object, along with the key and associated information, into the schema objects table. The application or client can also pass the operations involved with the metadata event. The server can enter each operation, along with the key and associated information, into the operations table.

At 656, the server returns the generated key to the calling client or application. The key is desirably used by the server or application to attach to objects involved in the metadata event. It may be appreciated that attaching the key associated with a metadata event to an object can allow a user to quickly determine the lineage associated of a particular object by querying the metadata journal server with the key.

The process then exits at 699.

Exemplary Computing Environment

Figure 7:
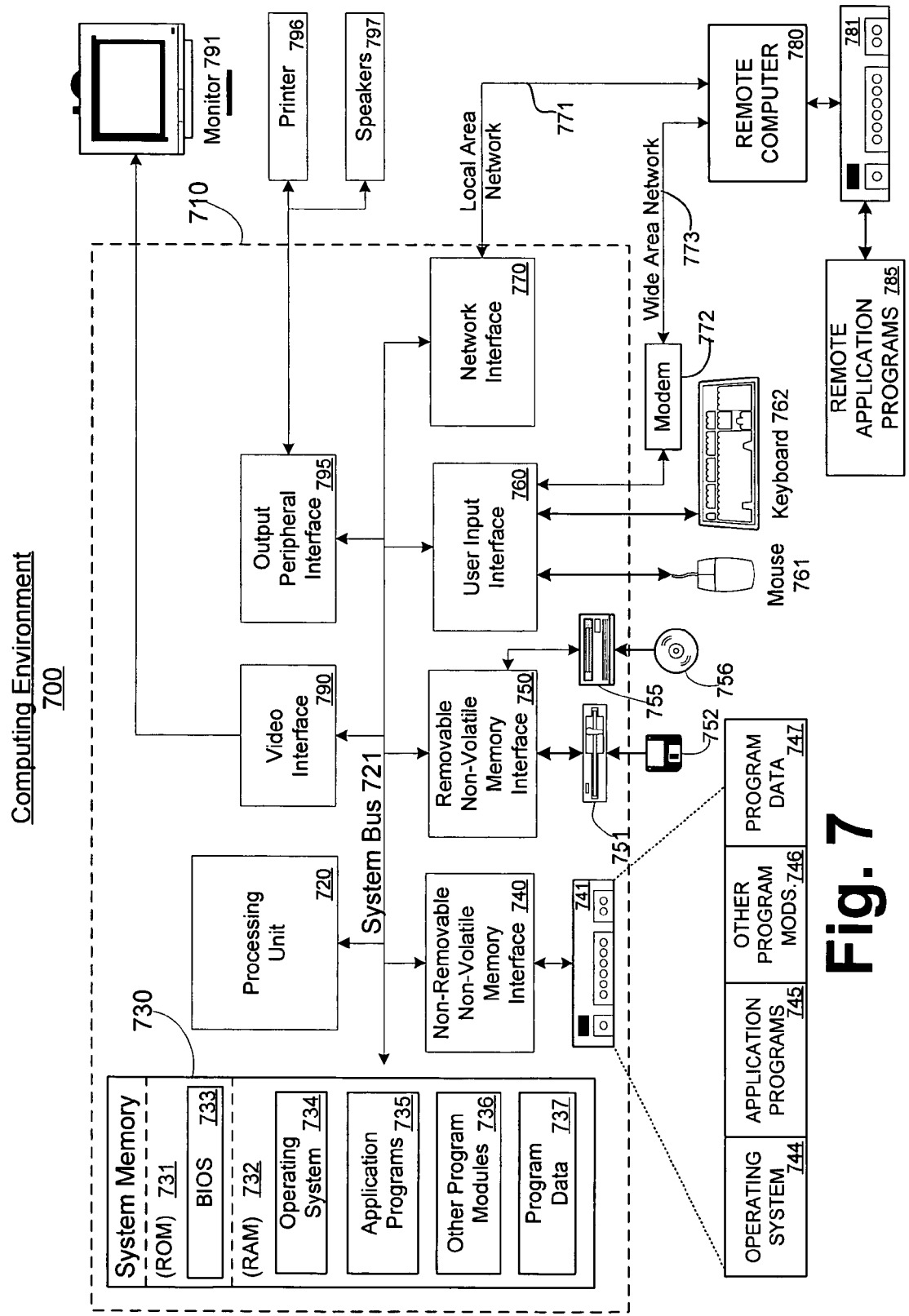
FIG. 7 is a block diagram showing an exemplary computing environment in which aspects of the invention may be implemented.

FIG. 7 illustrates an example of a suitable computing system environment 700 in which the invention may be implemented. The computing system environment 700 is only one example of a suitable computing environment and is not intended to suggest any limitation as to the scope of use or functionality of the invention. Neither should the computing environment 700 be interpreted as having any dependency or requirement relating to any one or combination of components illustrated in the exemplary operating environment 700.

The invention is operational with numerous other general purpose or special purpose computing system environments or configurations, such as for example, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

With reference to FIG. 7, an exemplary system for implementing the invention includes a general purpose computing device in the form of a computer 710. Components of computer 710 may include, but are not limited to, a processing unit 720, a system memory 730, and a system bus 721 that couples various system components including the system memory to the processing unit 720. The system bus 721 may be any of several types of bus structures including a memory bus or memory controller, a peripheral bus, and a local bus using any of a variety of bus architectures.

Computer 710 typically includes a variety of computer readable media, and includes both volatile and non-volatile media, removable and non-removable media.

The system memory 730 includes computer storage media in the form of volatile and/or non-volatile memory such as ROM 731 and RAM 732. A basic input/output system 733 (BIOS), containing the basic routines that help to transfer information between elements within computer 710, such as during start-up, is typically stored in ROM 731. By way of example, and not limitation, FIG. 7 illustrates operating system 734, application programs 735, other program modules 736, and program data 737.

The computer 710 may also include other removable/non-removable, volatile/non-volatile computer storage media. By way of example only, FIG. 7 illustrates a hard disk drive 741 that reads from or writes to non-removable, non-volatile magnetic media, a magnetic disk drive 751 that reads from or writes to a removable, non-volatile magnetic disk 752, and an optical disk drive 755 that reads from or writes to a removable, non-volatile optical disk 756. The hard disk drive 741 is typically connected to the system bus 721 through a non-removable memory interface such as interface 740, and magnetic disk drive 751 and optical disk drive 755 are typically connected to the system bus 721 by a removable memory interface, such as interface 750.

The drives and their associated computer storage media provide storage of computer readable instructions, data structures, program modules and other data for the computer 710. In FIG. 7, for example, hard disk drive 741 is illustrated as storing operating system 744, application programs 745, other program modules 746, and program data 747. Note that these components can either be the same as or different from operating system 734, application programs 735, other program modules 736, and program data 737. A user may enter commands and information into the computer 710 through input devices such as a keyboard 762 and pointing device 761, commonly referred to as a mouse, trackball or touch pad. These and other input devices are often connected to the processing unit 720 through a user input interface 760 that is coupled to the system bus, but may be connected by other interface and bus structures. A monitor 791 or other type of display device is also connected to the system bus 721 via an interface, such as a video interface 790. In addition to the monitor, computers may also include other peripheral output devices such as speakers 797 and printer 796, which may be connected through an output peripheral interface 795.

The computer 710 may operate in a networked environment using logical connections to one or more remote computers, such as a remote computer 780. The remote computer 780 may be a personal computer, a server, a router, a network PC, a peer device or other common network node, and typically includes many or all of the elements described above relative to the computer 710, although only a memory storage device 781 has been illustrated in FIG. 7. The logical connections depicted include a LAN 771 and a WAN 773, but may also include other networks.

When used in a LAN networking environment, the computer 710 is connected to the LAN 771 through a network interface or adapter 770. When used in a WAN networking environment, the computer 710 typically includes a modem 772 or other means for establishing communications over the WAN 773, such as the internet. The modem 772, which may be internal or external, may be connected to the system bus 721 via the user input interface 760, or other appropriate mechanism. In a networked environment, program modules depicted relative to the computer 710, or portions thereof, may be stored in the remote memory storage device. By way of example, and not limitation, FIG. 7 illustrates remote application programs 785 as residing on memory device 781. It will be appreciated that the network connections shown are exemplary and other means of establishing a communications link between the computers may be used.

As mentioned above, while exemplary embodiments of the present invention have been described in connection with various computing devices, the underlying concepts may be applied to any computing device or system. The various techniques described herein may be implemented in connection with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. The program(s) can be implemented in assembly or machine language, if desired. In any case, the language may be a compiled or interpreted language, and combined with hardware implementations.

The methods and apparatus of the present invention may also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an apparatus for practicing the invention. When implemented on a general-purpose processor, the program code combines with the processor to provide a unique apparatus that operates to invoke the functionality of the present invention. Additionally, any storage techniques used in connection with the present invention may invariably be a combination of hardware and software.

As mentioned above, while exemplary embodiments of the present invention have been described in connection with various computing devices, the underlying concepts may be applied to any computing device or system.

The various techniques described herein may be implemented in connection with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. The program(s) can be implemented in assembly or machine language, if desired. In any case, the language may be a compiled or interpreted language, and combined with hardware implementations.

The methods and apparatus of the present invention may also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an apparatus for practicing the invention. When implemented on a general-purpose processor, the program code combines with the processor to provide a unique apparatus that operates to invoke the functionality of the present invention. Additionally, any storage techniques used in connection with the present invention may invariably be a combination of hardware and software.

While the present invention has been described in connection with the preferred embodiments of the various Figures, it is to be understood that other similar embodiments may be used or modifications and additions may be made to the described embodiments for performing the same function of the present invention without deviating therefrom. Therefore, the present invention should not be limited to any single embodiment, but rather should be construed in breadth and scope in accordance with the appended claims.

What is claimed:

1. A system that facilitates metadata journaling comprising:
    a processor configured to:
    raising a metadata event by a client, in which an object has been created, modified, or deleted;
    sending by the client a message to a server indicating that the metadata event was raised, the message including a client identifier;
    receiving by the client from the server a determination that metadata can be accepted from the client based on the client identifier;
    receiving by the client a determination of metadata the client may record and instructions for the metadata to record from the server by using the client, the instructions specifying at least one of a plurality of types of metadata, wherein the metadata that the client may record is stored in a storage device with the client identifier and instructions associated with the client identifier, the instructions associated with the client identifier comprising object identifiers of objects for the client to record metadata from, a level of detail of the metadata to be recorded for each object, and a type of annotations to be recorded from each object;
    collecting by the client metadata responsive to the instructions and sending the collected metadata to the server;
    receiving by the client from the server a key generated for the metadata event, and the client sending the collected metadata and key to the server for storage, wherein the collected metadata is stored in a plurality of tables, each table corresponding to one of the specified types of metadata and the key comprises a unique name or number that identifies entries in one or more of the plurality of tables, wherein the entries are uniquely associated with the metadata event.

2. The system of claim 1, the collected metadata comprising object identifiers of objects involved in the metadata event matching object identifiers in the instructions.

3. The system of claim 1, the collected metadata comprising schema object identifiers of schema objects involved in the metadata event.

4. The system of claim 1, the collected metadata comprising operation identifiers for operations performed on the objects involved in the metadata event.

5. The system of claim 1, further comprising:
    an identification component that generates instructions for collecting metadata and sends the instructions to the client.

6. The system of claim 5, the received metadata comprising object identifiers of objects involved in the metadata event matching object identifiers in the instructions.

7. The system of claim 5, the received metadata comprising schema object identifiers of schema objects involved in the metadata event.

8. The system of claim 5, the received metadata comprising operation identifiers for operations performed on objects involved in the metadata event.

9. The system of claim 5, wherein the instructions for collecting metadata are generated using a client identifier.

10. The system of claim 5, wherein the instructions for collecting metadata are predetermined by a user or administrator.

11. A method for metadata journaling comprising:
    raising a metadata event by a client, in which an object has been created, modified, or deleted;
    sending by the client a message to a server indicating that the metadata event was raised, the message including a client identifier;
    receiving by the client from the server a determination that metadata can be accepted from the client based on the client identifier;
    receiving by the client a determination of metadata that the client may record and instructions for the metadata to record from the server by using the client, the instructions specifying at least one of a plurality of types of metadata, wherein the metadata that the client may record is stored in a storage device with the client identifier and instructions associated with the client identifier, the instructions associated with the client identifier comprising object identifiers of objects for the client to record metadata from, a level of detail of the metadata to be recorded for each object, and a type of annotations to be recorded from each object;
    collecting by the client metadata responsive to the instructions and sending the collected metadata to the server;
    receiving by the client from the server a key generated for the metadata event, and the client sending the collected metadata and key to the server for storage, wherein the collected metadata is stored in a plurality of tables, each table corresponding to one of the specified types of metadata and the key comprises a unique name or number that identifies entries in one or more of the plurality of tables, wherein the entries are uniquely associated with the metadata event.

12. The method of claim 11, further comprising:
the client receiving the key from the server.

13. The method of claim 11, wherein determining the metadata the client may record is responsive to the client identifier.

14. The method of claim 11, wherein the instructions for what metadata to record are predetermined.

15. The method of claim 11, wherein collecting metadata responsive to the instructions by the client and sending the collected metadata to the server comprises:
   determining which objects involved in the metadata event correspond to the requested objects in the instructions;
   determining if schema objects are associated with the corresponding objects; and
   determining operations performed on the corresponding objects.

16. The method of claim 15, further comprising sending an object identifier for each object involved in the metadata event corresponding to the requested objects in the instructions, along with a schema object identifier for the schema objects associated with the object and an operation identifier for the operations performed on the object, to the server.

17. A method for metadata journaling comprising:
   receiving on a computer an indication that a metadata event, in which an object has been created, modified, or deleted was raised by a client, the indication including a client identifier;
   determining if metadata can be accepted from the client based on the client identifier;
   determining metadata that the client may record and sending instructions for the metadata to record to the client, the instructions specifying at least one of a plurality of types of metadata;
   receiving metadata collected by the client responsive to the instructions;
   generating a key for the metadata event; and
   storing the collected metadata and key, wherein the collected metadata is stored in a plurality of tables, each table corresponding to one of the specified types of metadata and the key comprises a unique name or number that identifies entries in one or more of the plurality of tables, wherein the entries are uniquely associated with the metadata event;
   wherein storing the collected metadata and generated key comprises computer-executable instructions for:
   receiving the collected metadata from the client, including an object identifier for each object involved in the metadata event corresponding to requested objects in the instructions, along with a schema object identifier for schema objects associated with the object and an operation identifier for operations performed on the object;
   making an entry for each object identifier in an objects table along with the key;
   making an entry for each schema object identifier in a schema objects table along with the key; and
   making an entry for each operation identifier in an operations table along with the key.

18. A computer-readable storage medium having stored thereon computer-executable instructions for performing a method for metadata journaling comprising:
   raising a metadata event by a client, in which an object has been created, modified, or deleted;
   sending by the client a message to a server indicating that the metadata event was raised, the message including a client identifier;
   receiving by the client from the server a determination that metadata can be accepted from the client based on the client identifier;
   receiving by the client a determination of metadata that the client may record and instructions for the metadata to record from the server by using the client, the instructions specifying at least one of a plurality of types of metadata, wherein the metadata that the client may record is stored in a storage device with the client identifier and instructions associated with the client identifier, the instructions associated with the client identifier comprising object identifiers of objects for the client to record metadata from, a level of detail of the metadata to be recorded for each object, and a type of annotations to be recorded from each object;
   collecting by the client metadata responsive to the instructions and sending the collected metadata to the server;
   receiving by the client from the server a key generated for the metadata event, and the client sending the collected metadata and key to the server for storage, wherein the collected metadata is stored in a plurality of tables, each table corresponding to one of the specified types of metadata and the key comprises a unique name or number that identifies entries in one or more of the plurality of tables, wherein the entries are uniquely associated with the metadata event.

19. The computer-readable storage medium of claim 18, the method for metadata journaling further comprising:
   returning the key to the client.

20. The computer-readable storage medium of claim 19, wherein the instructions for what metadata to record are predetermined.

21. The computer-readable storage medium of claim 18, wherein determining the metadata the client may record is performed by the server using a client identifier.

22. The computer-readable storage medium of claim 21, wherein determining what metadata the client may record comprises computer-executable instructions for looking up the client in a storage device using a client identifier and returning the instructions associated with the client identifier contained in the storage device.

23. A computer-readable storage medium having stored thereon computer-executable instructions for performing a method for metadata journaling comprising:
   receiving an indication that a metadata event, in which an object has been created, modified, or deleted was raised by a client, the indication including a client identifier;
   determining if metadata can be accepted from the client based on the client identifier;
   determining metadata that the client may record and sending instructions for the metadata to record to the client, the instructions specifying at least one of a plurality of types of metadata;
   receiving metadata collected by the client responsive to the instructions;
   generating a key for the metadata event; and
   storing the collected metadata and key, wherein the collected metadata is stored in a plurality of tables, each table corresponding to one of the specified types of metadata and the key comprises a unique name or number that identifies entries in one or more of the plurality of tables, wherein the entries are uniquely associated with the metadata event,
   wherein storing the collected metadata and generated key comprises computer-executable instructions for:
   receiving the collected metadata from the client, including an object identifier for each object involved in the metadata event corresponding to requested objects in the instructions, along with a schema object identifier for schema objects associated with the object and an operation identifier for operations performed on the object;

making an entry for each object identifier in an objects table along with the key;

making an entry for each schema object identifier in a schema objects table along with the key; and making an entry for each operation identifier in an operations table along with the key.

24. A system that facilitates metadata journaling, comprising:

a memory storing instructions; and a processor that executes said instructions to implement steps of:

receiving an indication that a metadata event, in which an object has been created, modified, or deleted was raised by a client, the indication including a client identifier;

determining if metadata can be accepted from the client based on the client identifier;

determining metadata that the client may record and sending instructions for the metadata to record to the client, the instructions specifying at least one of a plurality of types of metadata;

receiving metadata collected by the client responsive to the instructions;

generating a key for the metadata event; and storing the collected metadata and key, wherein the collected metadata is stored in a plurality of tables, each table corresponding to one of the specified types of metadata and the key comprises a unique name or number that identifies entries in one or more of the plurality of tables, wherein the entries are uniquely associated with the metadata event; wherein storing the collected metadata and generated key comprises computer-executable instructions for:

receiving the collected metadata from the client, including an object identifier for each object involved in the metadata event corresponding to requested objects in the instructions, along with a schema object identifier for schema objects associated with the object and an operation identifier for operations performed on the object;

making an entry for each object identifier in an objects table along with the key;

making an entry for each schema object identifier in a schema objects table along with the key; and making an entry for each operation identifier in an operations table along with the key.

25. The system of claim 24, wherein the processor stores the collected metadata and key by:

storing an entry for a schema object identifier along with the key;

storing an entry for an object identifier along with the key; and making an entry for an operation identifier along with the key.

26. The system of claim 24, wherein the processor determines what metadata the client can record by looking up the client in the memory using the client identifier and returning instructions associated with the client identifier contained in the memory.

27. The system of claim 24, wherein the indication that a metadata event was raised includes the processor sending a client identifier.

28. The system of claim 24, wherein the processor sends instructions for the metadata to record by sending instructions containing object identifiers of objects for the client to record metadata from, a level of detail of the metadata to be recorded for each object, and a type of annotations to be recorded from each object.

* * * * *